Aug. 15, 1933.  W. HASSELKUS  1,922,241
SPEED TRANSMISSION
Filed Jan. 8, 1931  13 Sheets-Sheet 5
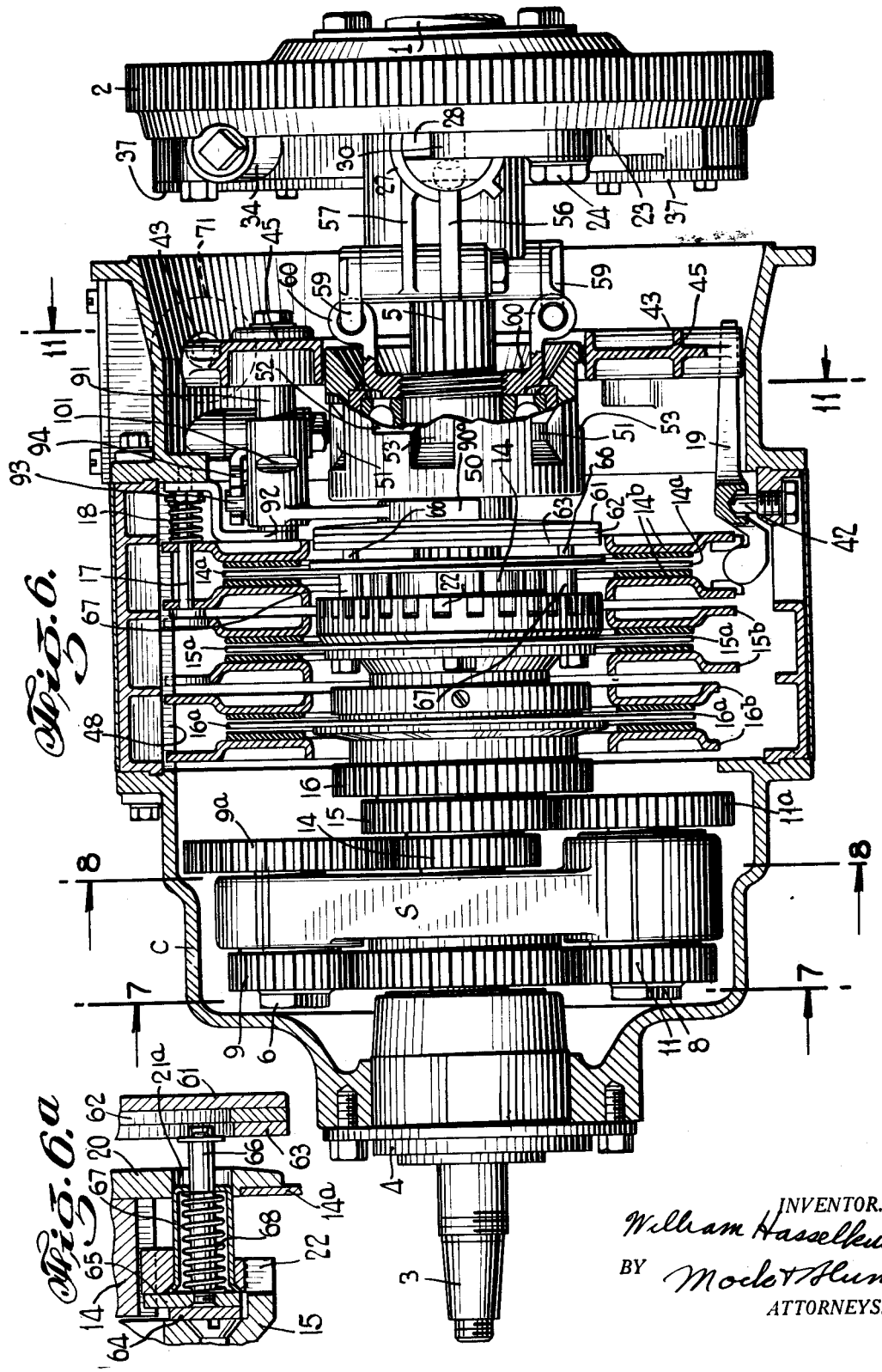
INVENTOR.
William Hasselkus
BY Mock & Blum
ATTORNEYS.

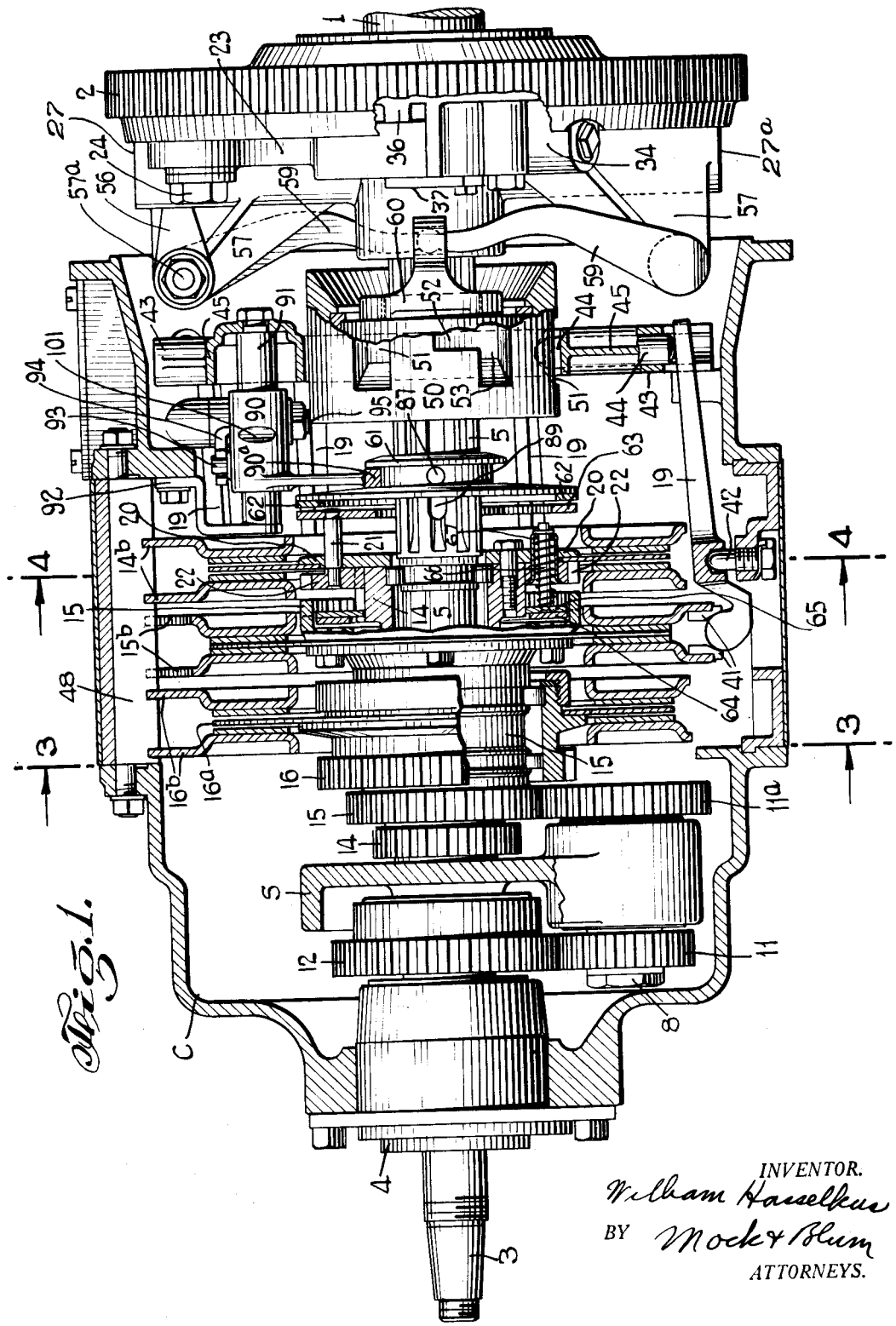

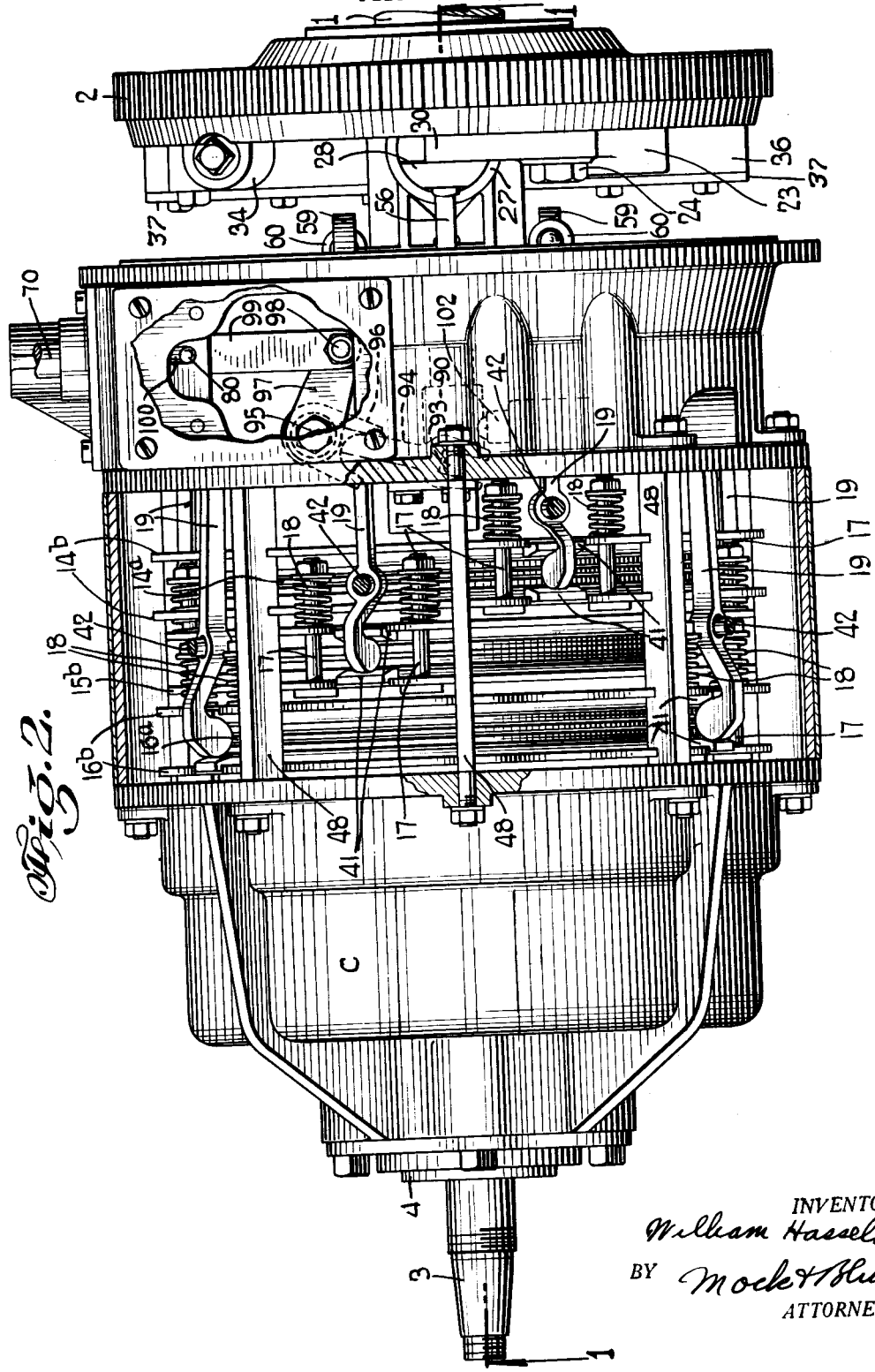

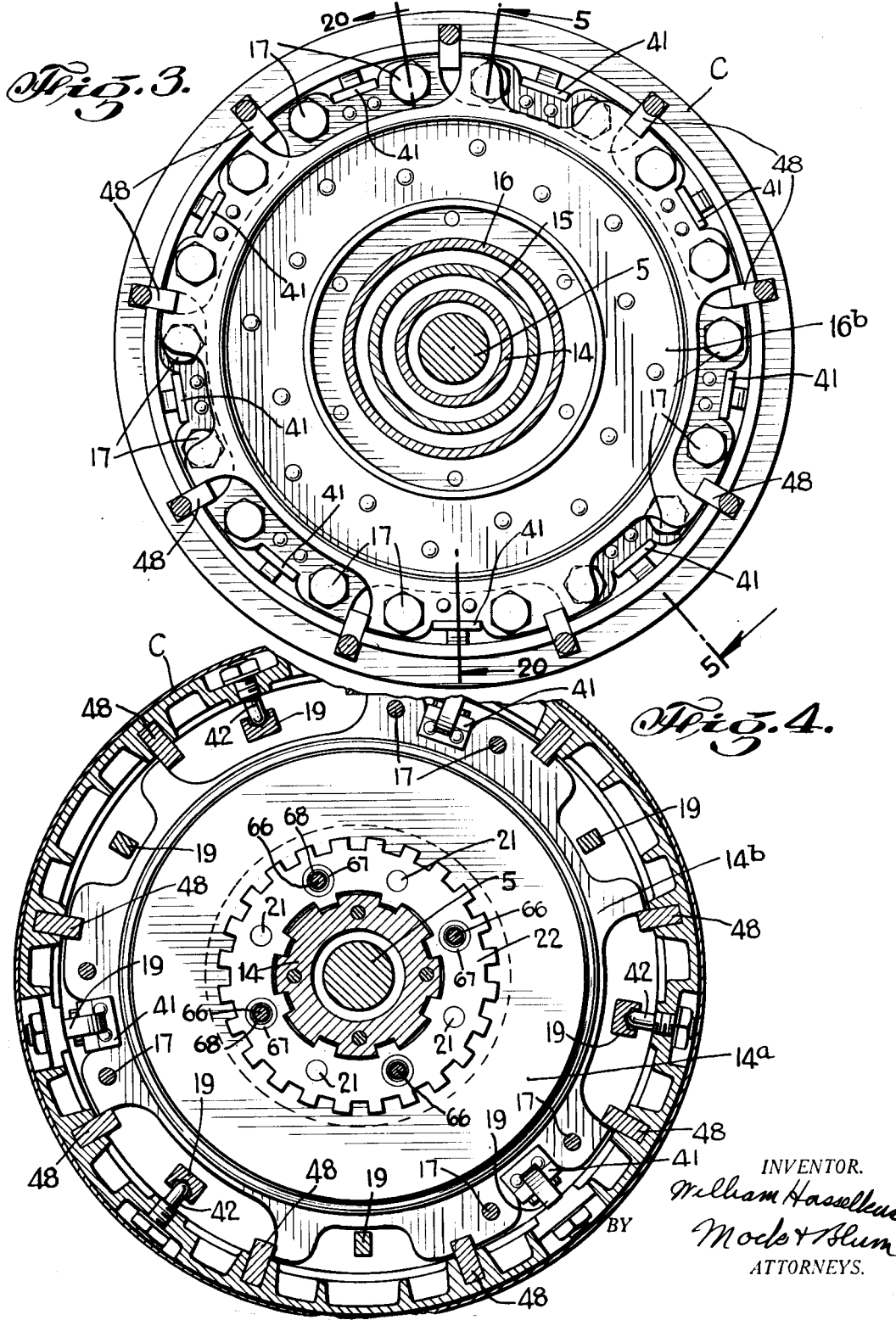

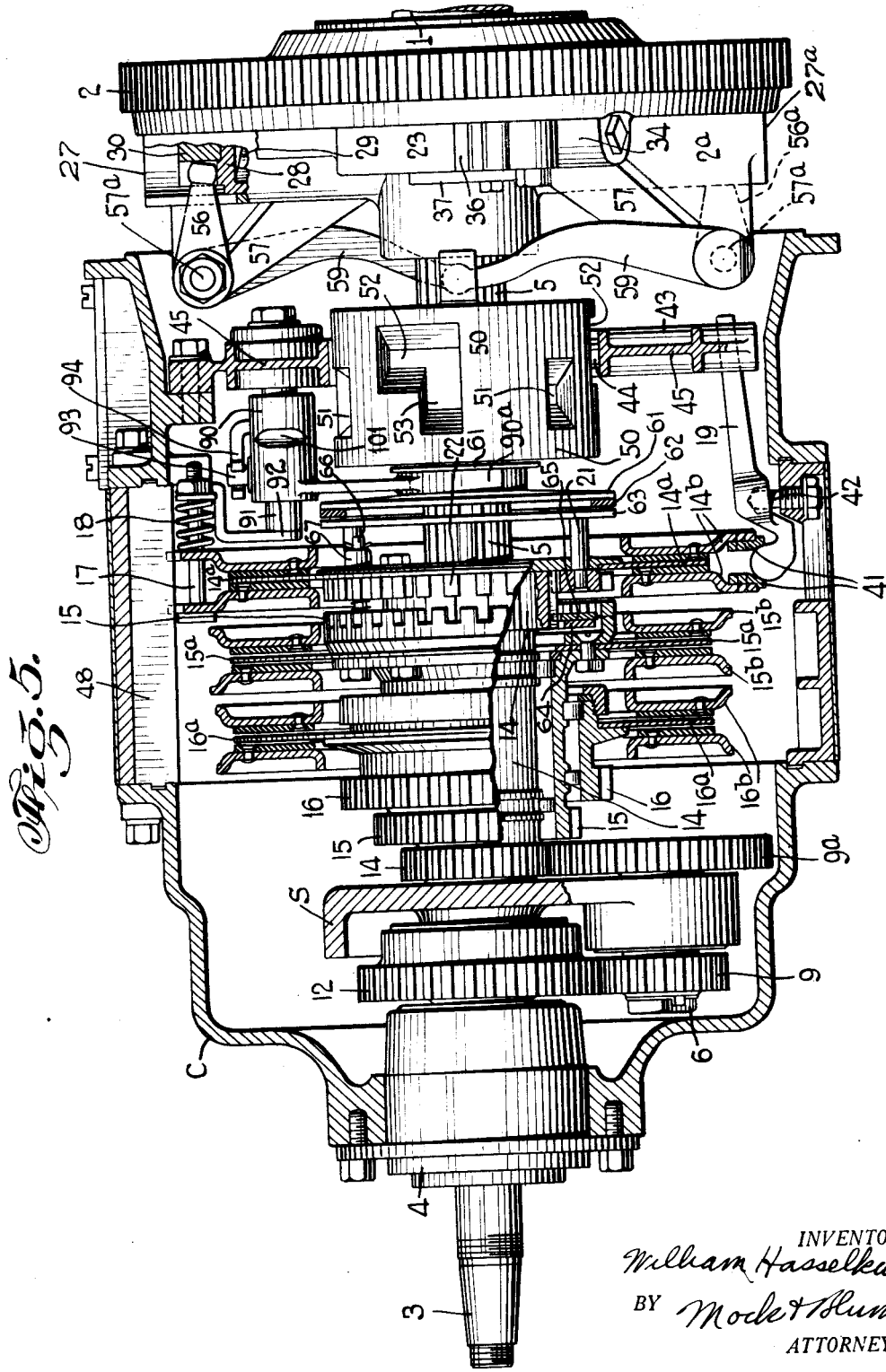

Aug. 15, 1933.  W. HASSELKUS  1,922,241
SPEED TRANSMISSION
Filed Jan. 8, 1931  13 Sheets-Sheet 6
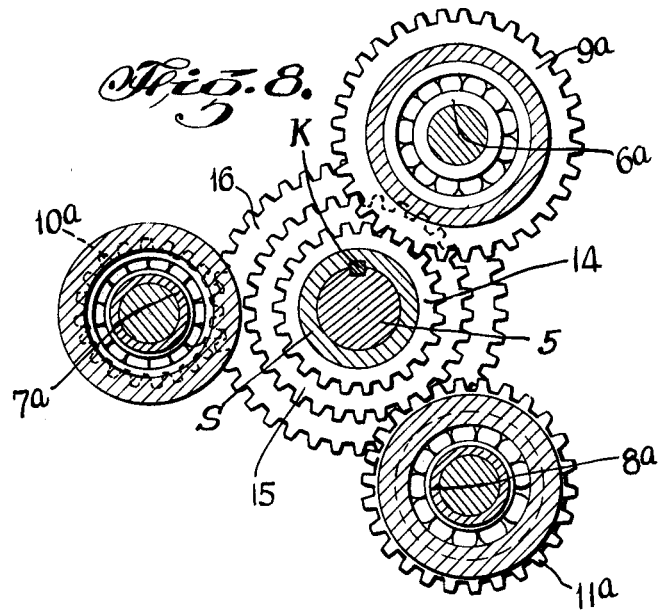
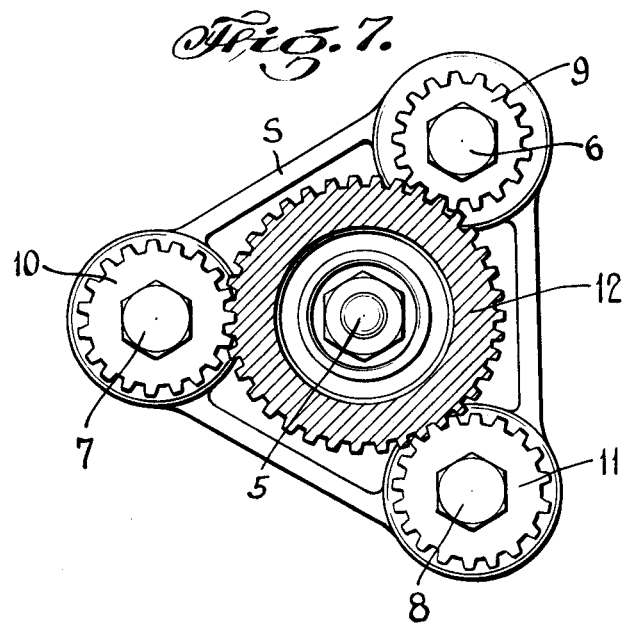
INVENTOR.
William Hasselkus
BY Moder Blum
ATTORNEYS

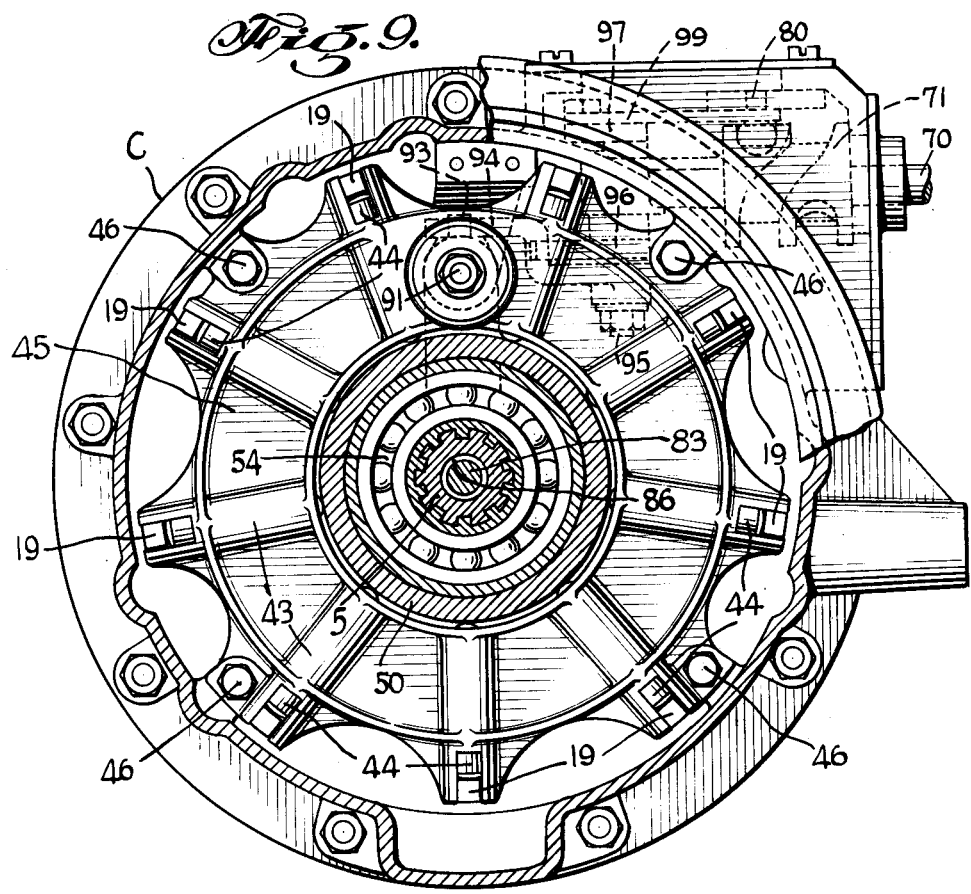
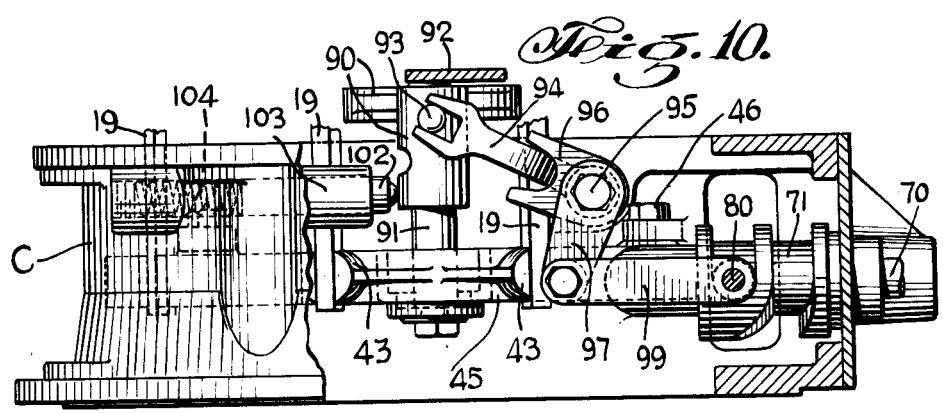

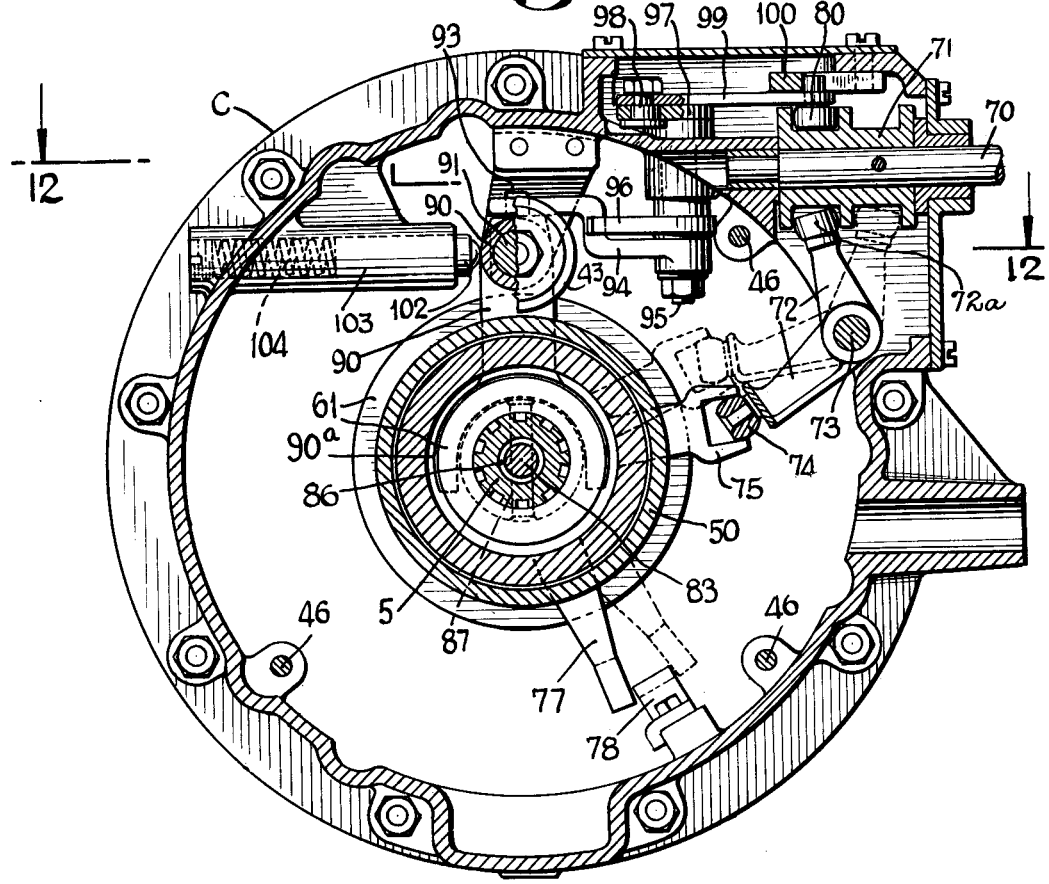
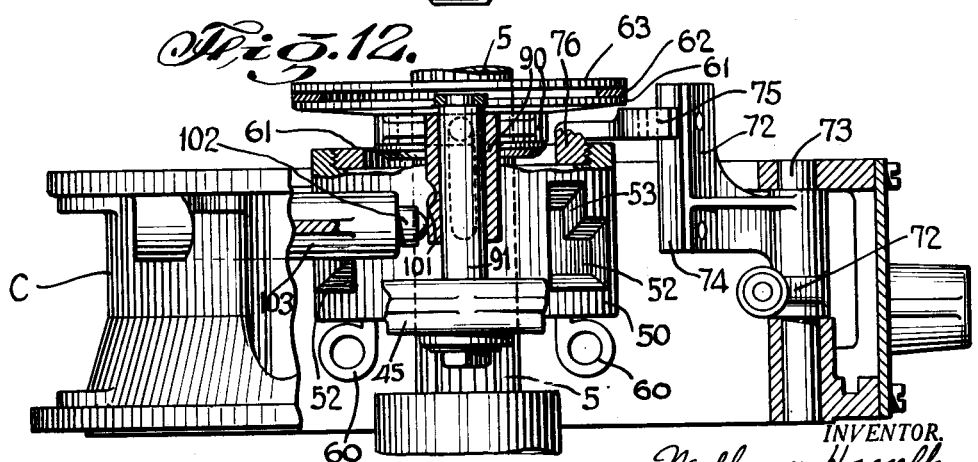

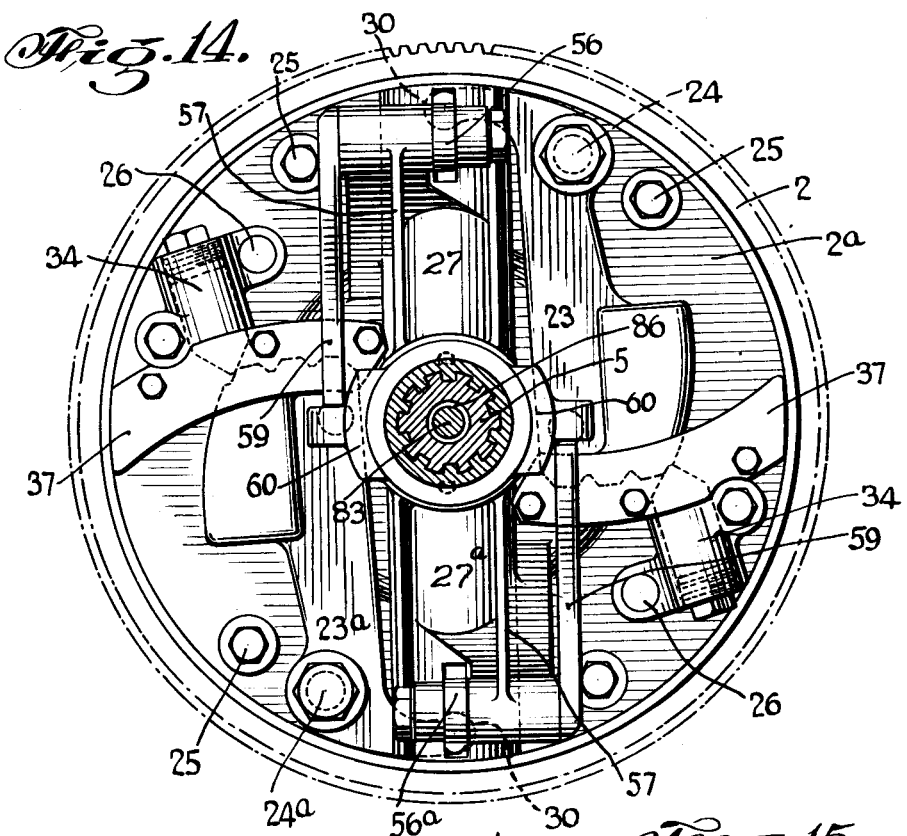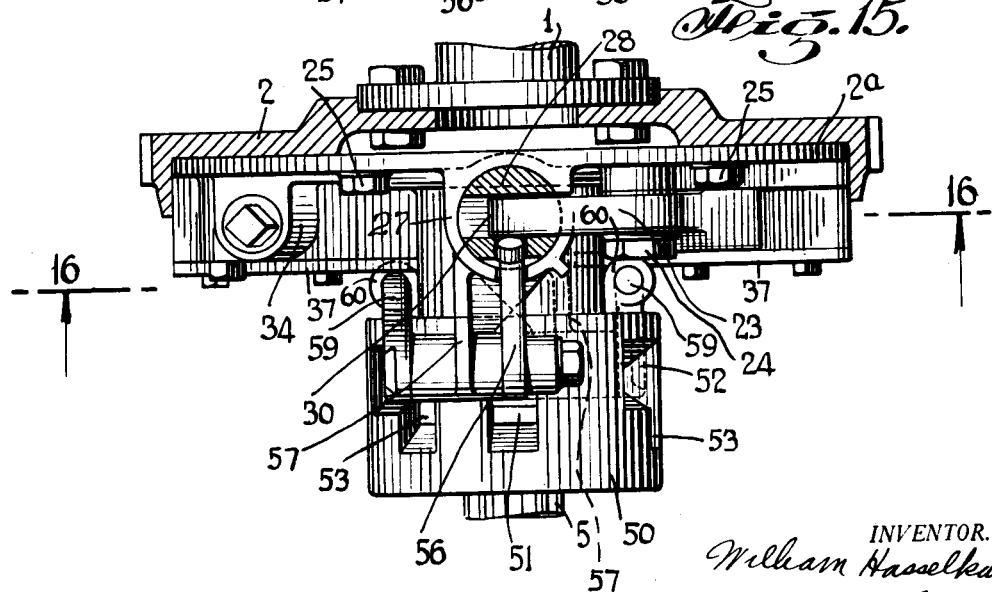

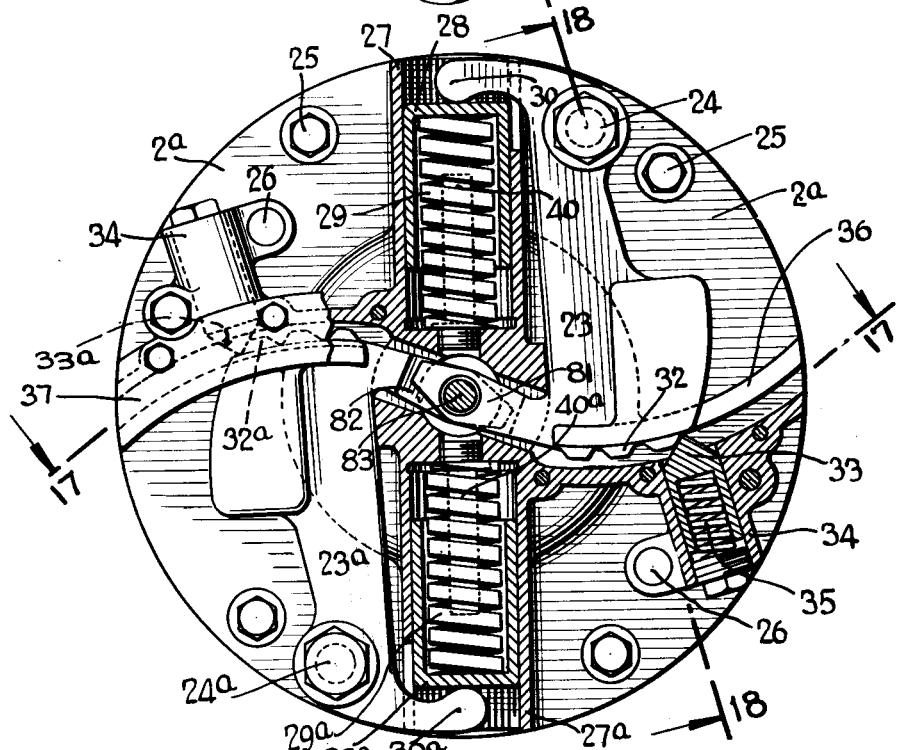
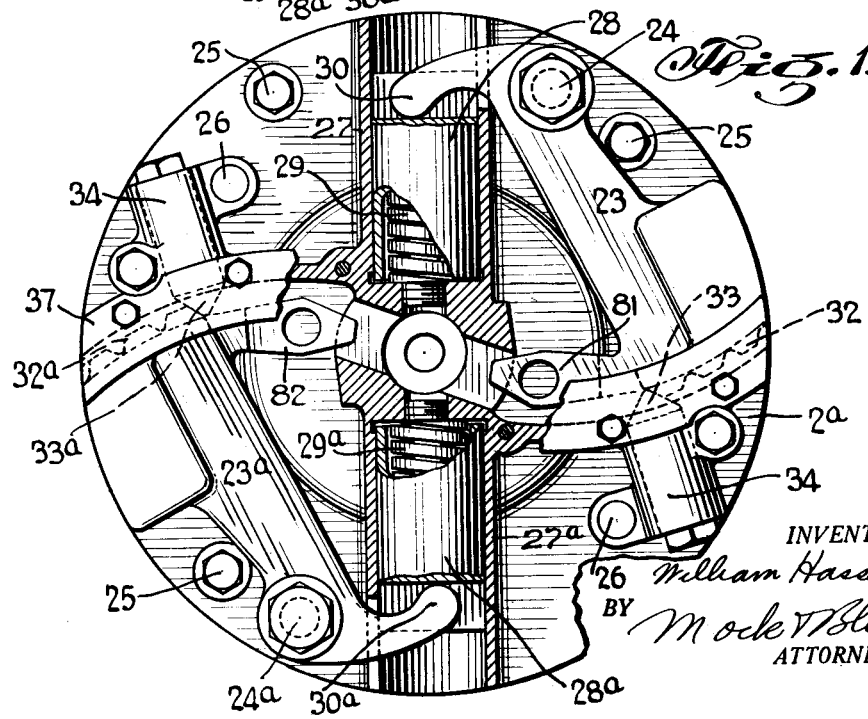

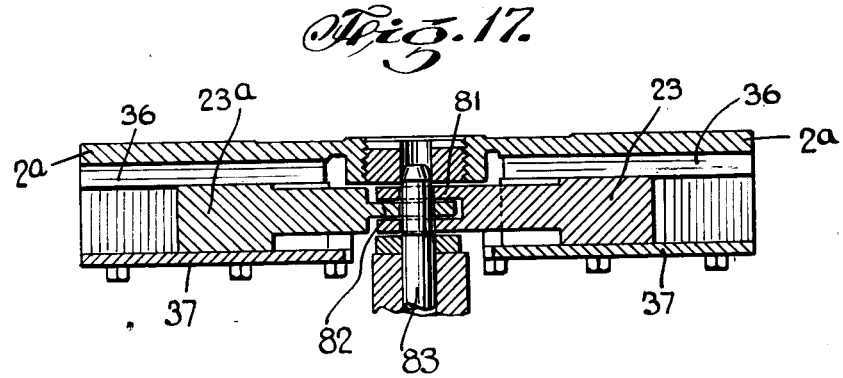
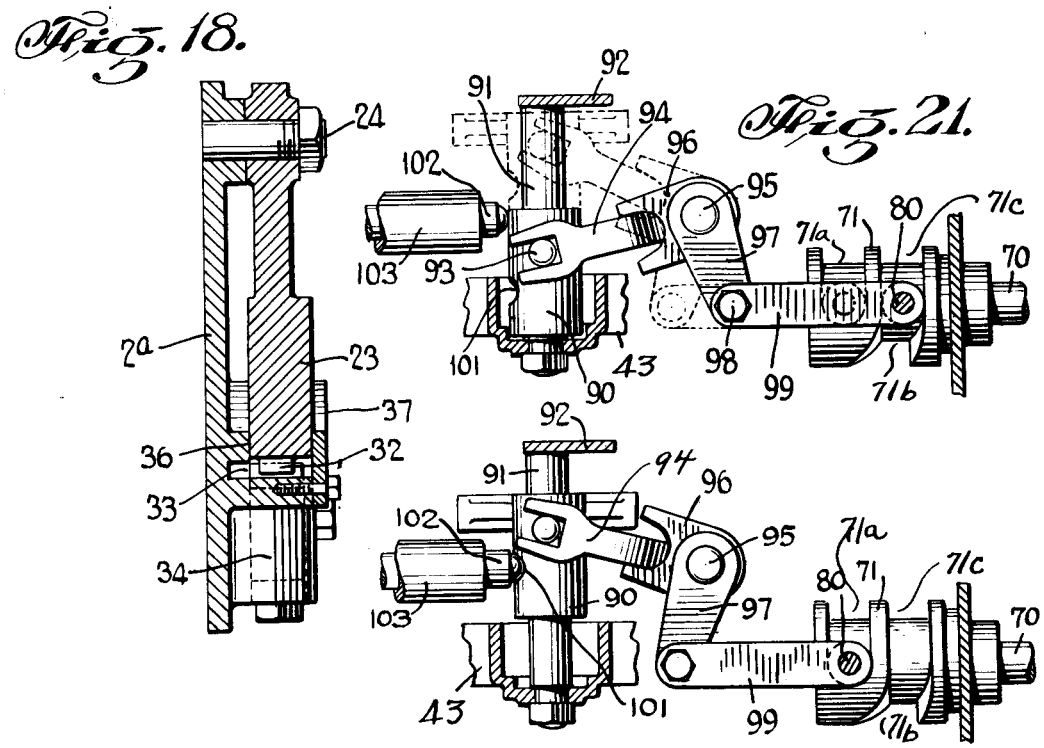

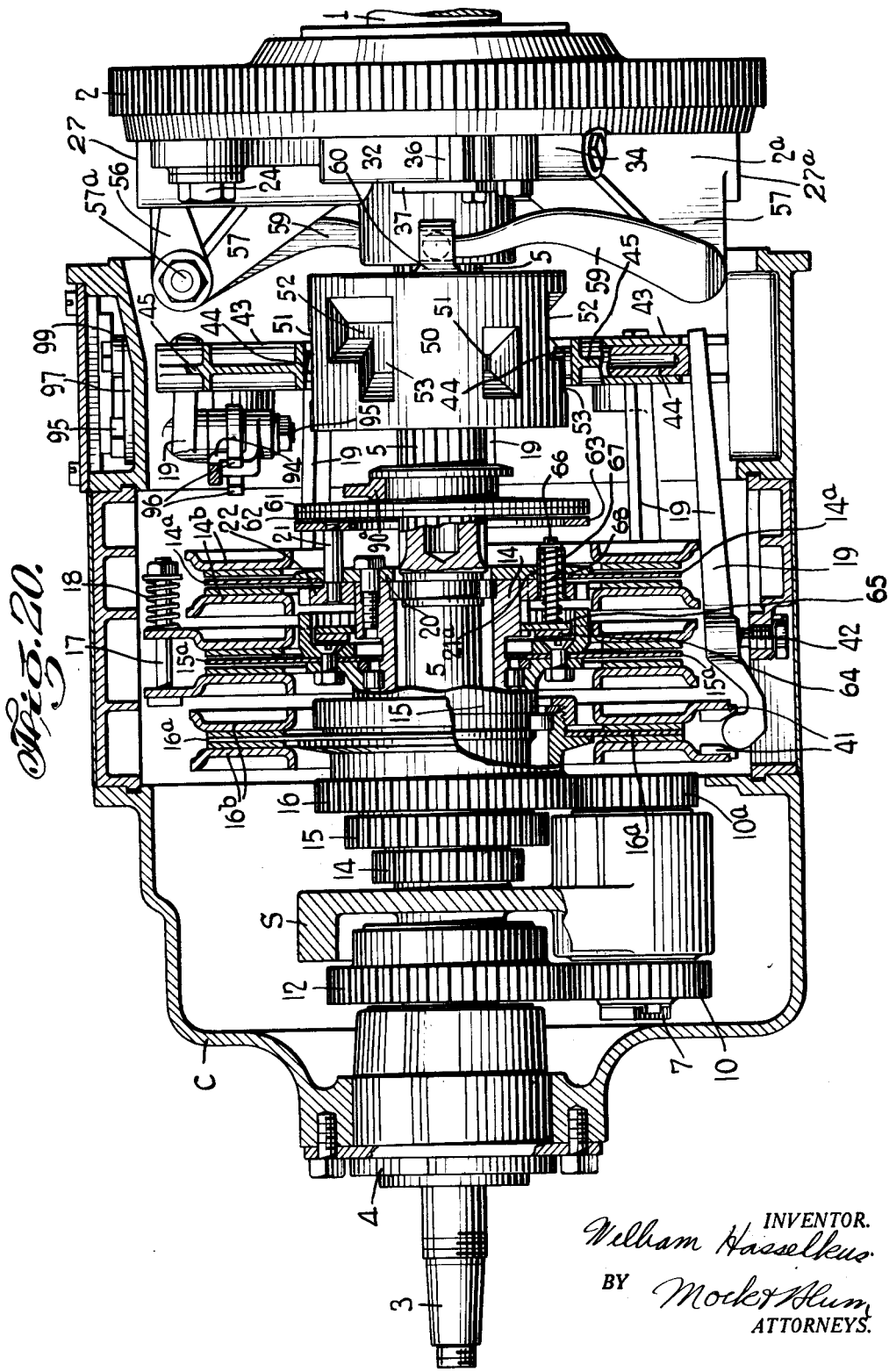

Patented Aug. 15, 1933

1,922,241

UNITED STATES PATENT OFFICE 1,922,241

SPEED TRANSMISSION

William Hasselkus, New York, N. Y., assignor to Cole Service Plan, Inc., New York, N. Y., a Corporation of New York Application January 8, 1931. Serial No. 507,395

26 Claims. (Cl. 74—34)

My invention relates to a new and improved speed transmission.

One of the objects of my invention is to provide a speed transmission which shall be especially adapted for use in automobiles.

Another object of my invention is to provide an automatic speed transmission in which the various speeds are selected by a governor device whose action is controlled by the speed of the engine.

Another object of my invention is to provide an improved speed transmission of the automatic type, in which planetary gears are employed, although the invention is not limited to this particular type of gearing.

Another object of my invention is to provide an automatic speed transmission in which the forward speeds, including high speed, are selected by automatically moving a master control member in a forward direction, and in which the reverse speed is selected by turning or otherwise suitably moving said master control member and then causing it to be forwardly shifted by the action of a governor or other suitable actuating means.

Another object of my invention is to provide an automatic speed transmission of the planetary type, in which the various speeds are controlled by means of speed control sleeves which are selectively braked or clutched by means of separate clutch members.

Another object of my invention is to provide an automatic speed transmission of the planetary type in which the above mentioned clutch members are actuated into operative position by means of springs and in which the automatic device operates to release clutch control members, in order to permit said clutches to move to the operative position.

Another object of my invention is to provide a simple and efficient device of rugged and reliable construction.

Another object of my invention is to provide a device in which high speed is secured by interlocking the elements of the planetary gear system and in which clashing of gears is avoided by means of a friction device which is automatically operated when the transmission is shifted into high.

Another object of my invention is to produce an automatic transmission in which the shift from one forward speed to the next higher forward speed is secured at a predetermined engine speed, and in which the same shift in the reverse direction is accomplished at a lower engine speed.

Another object of my invention is to produce an automatic transmission which can be locked in the neutral position so that the engine speed can then be made as high as desired without operating the speed transmission.

Another object of my invention is to provide an automatic speed transmission which shall not be affected by the vibration of the engine or of the vehicle, and in which overrunning of the control devices is prevented.

Other objects of my invention will be set forth in the following description and drawings which illustrate preferred embodiments thereof, it being understood that the above general statement of the objects of my invention is intended to merely generally explain the same and not to limit it in any manner.

Fig. 1 is a vertical section taken on the line 1—1 of Fig. 2, showing the transmission in first speed.

Fig. 2 is a plan view of Fig. 1, also showing the transmission in first speed.

Fig. 3 is a sectional view on the line 3—3 of Fig. 1.

Fig. 4 is a section on the line 4—4 of Fig. 1.

Fig. 5 is a section on the line 5—5 of Fig. 3, showing the transmission in second speed.

Fig. 6 is a sectional view similar to Fig. 5, but showing the transmission in high speed.

Fig. 6a is a detail view of the friction device by means of which the speed of the first-speed control sleeve and of the second-speed control sleeve are substantially equalized before shifting the device into high.

Fig. 7 is a section on the line 7—7 of Fig. 6.

Fig. 8 is a section on the line 8—8 of Fig. 6.

Fig. 9 is a section on the line 9—9 of Fig. 13.

Fig. 10 is a detail plan view of Fig. 9 showing the transmission in high speed, some of the parts being shown as broken away, in order to clearly illustrate the device.

Fig. 11 is a section on the line 11—11 of Fig. 6 showing the device in high speed.

Fig. 12 is a section on the line 12—12 of Fig. 11 showing the device in high speed.

Fig. 14 is a section on the line 14—14 of Fig. 13 showing the device in locking neutral position.

Fig. 15 is a detail plan view of Fig. 14 showing the device in locking neutral position.

Fig. 16 is a section on the line 16—16 of Fig. 15, showing the device in locking neutral position.

Fig. 17 is a section on the line 17—17 of Fig. 16 showing the transmission in locking neutral position.

Fig. 18 is a section on the line 18—18 of Fig. 16, showing the device in locking neutral position.

Fig. 19 is a detail view showing the governor in its extreme outer position, in which the transmission is in high speed.

Fig. 20 is a sectional view on the line 20—20 of Fig. 3, showing the transmission in reverse speed.

Fig. 21 is a detail fragmentary view showing a part of the speed selecting mechanism, the full line position of the parts representing the locking neutral position, and the dotted line position of the parts illustrating the device in the high speed position.

Fig. 22 is a detail partial view of the device shown in Fig. 21, illustrating the position of certain parts in first speed, second speed, reverse speed, and the free neutral position.

Speed transmission

Figure 13:
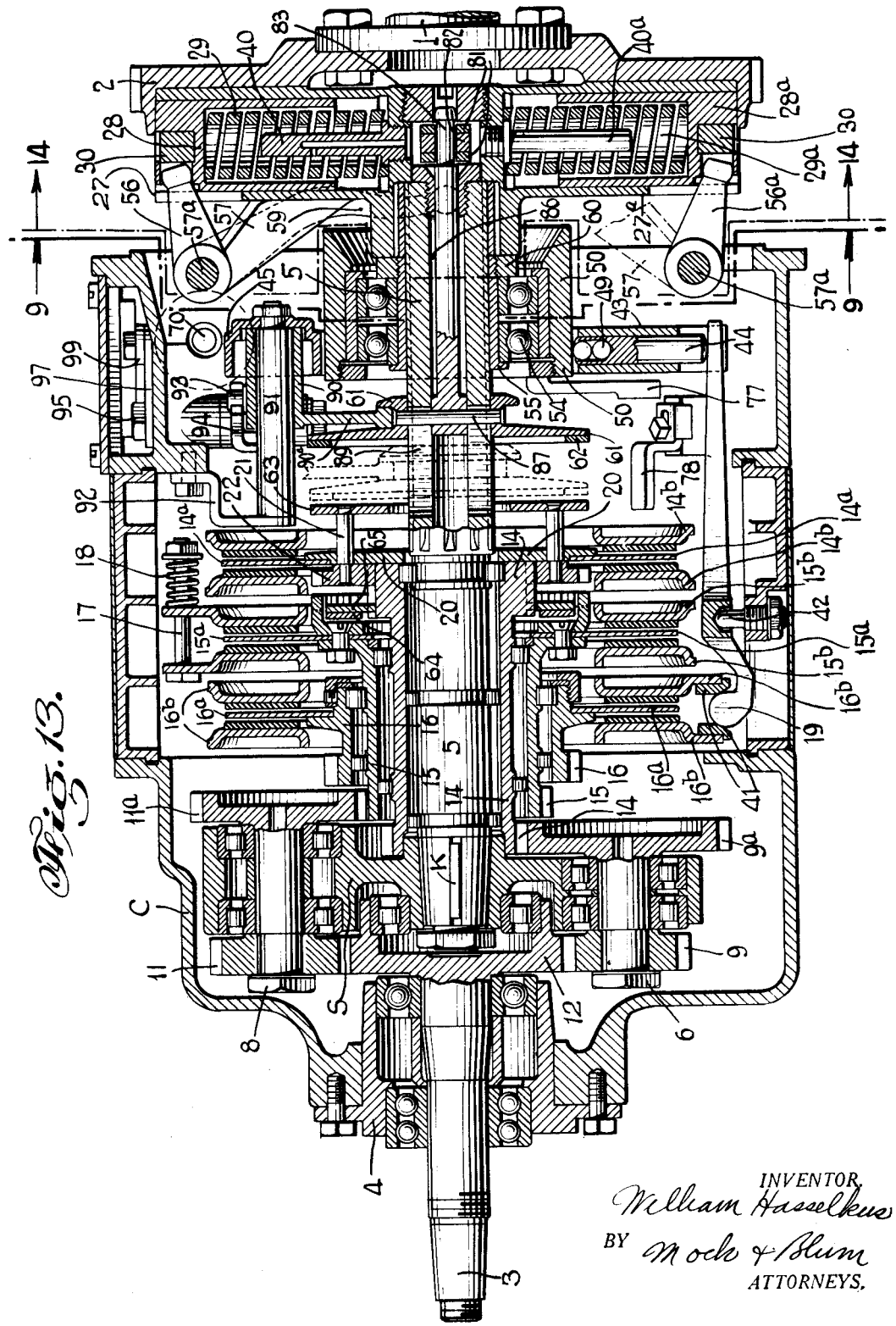
Fig. 13 is a vertical sectional view showing the transmission in the locking neutral position, the dotted line position of some of the parts illustrating the device in the free neutral position.

The essential parts of the speed transmission, which may be selected either manually or by the action of a governor, are as follows:—

As shown in Fig. 1, a motor shaft 1 is provided having a flywheel 2. The motor shaft 1 may be the shaft of an ordinary internal combustion engine. The driven shaft 3 is also shown in Fig. 1, and this shaft 3 is to be turned at different speeds relative to the motor shaft 1. When the shafts 1 and 3 turn at the same velocity, the transmission is in high speed.

The parts of the transmission are located within a casing C which can be made of several parts, and this casing C can be filled with any suitable lubricant.

As shown in Fig. 13, the driven shaft 3 is provided with ball-bearings which are held in position by a retaining member 4.

As shown in Fig. 13, the transmission includes a drive-shaft 5 which is provided with a spider S suitably connected thereto, as for example by a key K. The shaft 5 and the spider S therefore turn in unison.

As shown in Fig. 8, the spider S is provided with three symmetrically disposed hollow stub-shafts 6a, 7a and 8a.

As shown in Fig. 7, these stub-shafts are held in position on the spider S by means of bolts 6, 7 and 8. The stub-shaft 8a may be designated as the first-speed shaft, the stub-shaft 6a may be designated as the second-speed shaft and the stub-shaft 7a may be designated as the reverse-speed shaft.

For convenience the end of the transmission which is adjacent the flywheel 2 may be designated as the outer end.

As shown in Fig. 7, the stub-shafts 6a, 7a and 8a are provided with inner gears 9, 10 and 11 which are respectively keyed or otherwise connected thereto and these inner planetary gears mesh with a sun gear 12 which is either integral with or is suitably keyed to the driven shaft 3.

As shown in Fig. 8, the outer ends of the planetary shafts 6a, 7a and 8a are provided with outer planetary gears 9a, 10a and 11a. These outers gears 9a, 10a and 11a respectively mesh with gear teeth which are provided at the adjacent ends of a plurality of speed control sleeves which are concentrically arranged, as shown in Fig. 13. The second speed gear 9a which has the largest diameter of the outer planetary gears, meshes with the teeth of the second-speed control sleeve 14. The gear 11a which has the next largest diameter, meshes with the teeth of the first-speed control sleeve 15. The reverse gear 10a, which has the smallest diameter of this set of gears, meshes with the teeth of the reverse speed control sleeve 16.

As shown in Fig. 1, the diameter of the teeth of the second-speed control sleeve 14 is less than the diameter of the corresponding teeth of the first-speed control sleeve 15, and the pitch diameter of the teeth of the reverse speed control sleeve 16 is larger than that of the teeth of the first-speed control sleeve 15.

As shown in Fig. 13, the planetary shafts 6a, 7a, and 8a are mounted in suitable anti-friction bearings in the spider S, these anti-friction bearings being conventionally illustrated.

As shown in Fig. 13, the speed control sleeves 14, 15 and 16 are concentrically disposed and they are provided with anti-friction bearings so that the innermost speed control sleeve 14 can freely turn upon the shaft 5, and each of the other speed control sleeves can freely turn with respect to the adjacent inner control sleeve. Hence, all of the control sleeves can turn freely with respect to each other, and with respect to the shaft 5.

Each of the speed control sleeves is provided with a clutch flange and with a separately operable clutch therefor.

As shown in Fig. 13, the reverse-speed control sleeve 16 is provided with a clutch flange 16a, the first-speed control sleeve 15 is likewise provided with a clutch flange 15a, and the second-speed control sleeve 14 is provided with a clutch flange 14a. These clutch flanges 14a, 15a and 16a have the same outer diameters, and they are arranged along the axis of the device.

As shown in Fig. 13, the control sleeves are of different lengths so that their clutch flanges may be disposed in the manner above specified.

As shown in Fig. 13, the clutch flange 16a is provided with a pair of clutch members 16b, the clutch flange 15a is provided with a pair of clutch members 15b, and the clutch flange 14a is provided with a pair of clutch members 14b.

It is clear that any speed, including reverse speed and excepting high speed, can be selected by preventing the turning of the selected speed control sleeve. Each pair of clutch members, as for example the clutch members 16b, is connected by means of a plurality of rods 17 which are shown in Fig. 3.

As shown in Fig. 5, these rods 17 are provided with compression springs 18 so that these compression springs 18 move the respective pair of clutch members against the respective clutch flange. As shown in Fig. 5, each of said rods 17 is provided with heads at the outer ends thereof. For example, the compression spring 18 shown in Fig. 5 is between one of the heads of a rod 17 and the adjacent clutch member 14b, and the head at the other end of the rod 17 is adjacent the other clutch member 14b. Hence the compression spring 18 tends to urge the clutch members 14b in opposite directions against the intermediate clutch flange 14a. The rods 17 are not connected to the casing C.

However, and as clearly shown in Figs. 1 and 4, the rotation of the clutch members 14b, 15b and 16b is prevented by means of keys 48, which are connected to the casing C and which fit into slots located in said clutch members, so that said clutch members may freely slide in a longitudinal or axial direction, but are prevented from turning with respect to the casing C.

As shown in Fig. 1 for example, each pair of clutch members, such as the clutch members 15b, is provided with control levers 19 having tapered heads. These tapered heads cooperate with shoes 41 having outwardly tapered ends. Each pair of clutch members is provided with a plurality of said control levers 19, in order to produce a uniform movement of said clutch members.

When all the clutch levers 19 are in the operative position shown in Fig. 6, the transmission is in "high", or neutral, or lock neutral.

The pressure of the springs 18 associated with each pair of clutch members, operates to outwardly move the tapered heads of the control levers 19, so that said clutch members are forced to their operative position, to engage the corresponding clutch flange of the corresponding speed-control sleeve. The movement of the heads of the control levers 19 to their inoperative position is controlled by means of control mechanism which is later described.

In order to have high speed, the second-speed control sleeve 14 and the first-speed control sleeve 15 are locked together. This is done by the parts shown in Fig. 13. The second-speed control sleeve 14 is provided with a plate 20 at the outer or front end thereof and this plate 20 is provided with a plurality of openings through which rods 21 slidably pass. The rods 21 are connected with, and they actuate, a locking member 22 having teeth or splines at its outer periphery. The adjacent end of the first-speed control sleeve 15 is provided with recesses which receive the said teeth or splines of the locking member 22. Hence, by moving the locking member 22 inwardly, its teeth or splines engage the recesses in the adjacent end of the first-speed control sleeve 15, which causes said first-speed control sleeve and the second-speed control sleeve to be locked together so that they turn as a unit which causes the shafts 5 and 3 to turn at the same speed. Any clashing of gears is wholly or partially prevented by devices later to be described, when the transmission is shifted into "high".

*Selector mechanism*

As shown in Figs. 14, 16 and 19, the flywheel 2 is provided with an inner casing 2a which is bolted thereto by means of bolts 25. This casing 2a has governor arms 23 and 23a which are pivotally connected thereto at 24 and 24a. In order to facilitate the assembly of the flywheel 2 and the casing 2a, dowel pins 26 are provided which are connected to the flywheel 2 and which pass through suitable holes in the casing 2a.

As shown in Fig. 16, the casing 2a is provided with sleeves or cylinders 27 and 27a, in which piston members 28 and 28a are slidably mounted. Compression springs 29 and 29a are located in the cylinders 27 and 27a, in order to force said pistons 28 and 28a outwardly. As shown in Fig. 16, the governor arms 23 and 23a are provided with operating heads 30 and 30a against which said pistons 28 and 28a are forced by the compression springs 29 and 29a. Hence, the compression springs 29 and 29a tend to move the governor arms 23 and 23a to the position shown in Fig. 16.

Fig. 16 illustrates the positions of the pistons and of the governor arms when the flywheel is not turning. However, when the flywheel 2 is revolved, the centrifugal force causes the governor arms 23 and 23a to move apart, as shown in Fig. 19, so that the pistons 28 and 28a are moved inwardly, thus compressing the springs 29 and 29a.

As shown in Figs. 16 and 19, the governor arms 23 and 23a are provided with sectors having cam teeth 32 and 32a which can be releasably engaged by pawls 33 and 33a. These pawls 33 and 33a are of identical construction, so that it is only necessary to describe one of them.

As shown in Fig. 16, the releasable locking pawl 33 is slidably mounted in a sleeve or cylinder 34 which is connected to or which forms part of the casing 2a. A compression spring 35 is provided for forcing the locking pawl 33 to its outer position.

In order to prevent any lateral wabbling of the governor arms 23 and 23a, each of them slides against a guide ridge 36, and an inner plate 37 is provided which prevents any movement of said governor arms 23 and 23a, save the desired turning movement.

Referring to Fig. 16, it can be seen that three cam teeth 32 and three cam teeth 32a are respectively provided for the governor arms 23 and 23a. The outermost cam tooth 32, that is, the cam tooth 32 which is at the right-hand side of Fig. 16, may be designated as the "first-speed cam tooth", the next cam tooth may be designated as the "second-speed cam tooth", and the remaining cam tooth may be designated as the "high-speed cam tooth".

The same construction is found in the governor arm 23a, it being generally noted that the governor arms 23 and 23a are of identical construction and simultaneously operate in like manner.

The right-hand edge of the first-speed cam tooth 32 is so shaped or inclined with respect to the taper of the head of the pawl 33, and with respect to the strength of the compression spring 35, so that a relatively small centrifugal force, which can be produced by a relatively low speed of the engine, can force the first-speed cam tooth 32 beyond the pawl 33. The pawl 33 is temporarily forced inwardly when the proper centrifugal force is exerted, and the pawl 33 is then forced outwardly by the spring 35 so that it is locked in the recess between the first-speed tooth 32 and the second-speed tooth 32. In this position the transmission has been shifted to first speed, by mechanism which will be later described. This first speed position would correspond to a speed of the automobile of 5-9 miles per hour depending upon the design of the engineer.

When the speed of the engine is sufficiently increased, the taper of the right-hand edge of the second tooth 32 is sufficient to temporarily force the pawl 33 inwardly, and the pawl 33 is then forced outwardly by the spring 35 until it is located between the second and third teeth. The taper of the right-hand edge of the second-speed cam tooth 32 is properly chosen, so that the shift from first speed to second speed is made when the vehicle is moving at a speed of 18-20 miles an hour, or whatever may be chosen for second speed by the design of the engineer.

When the speed of the engine has been sufficiently increased, third tooth 32 moves the pawl 33 inwardly, so that the high speed position shown in Fig. 19 is secured.

In this position the outer edges of the arms 23 and 23a abut the rim of the casing 2a so that an increase of the engine speed does not produce any further operation of the governor arms 23 and 23a. When the transmission is in high speed, the pawls 33 and 33a prevent any change in the transmission, due to a temporary fall or fluctuation of engine speed. Likewise, the centrifugal force is not required to hold the transmission in any speed, or to provide the braking action necessary for a speed below high speed, or to maintain the transmission in high speed. The pawls 33 and 33a serve to positively hold the transmission in the proper speed, and the centrifugal force merely overcomes the holding action of said pawls.

When the speed of the engine is lowered, the left-hand edges of the cam teeth 32 and 32a operate to successively actuate the pawls 33 and 33a, so that the transmission automatically shifts back to lower speeds.

The taper of the left-hand edges of said teeth 32 and 32a is so chosen that when the transmission is reversely shifted from a high speed to the next low speed, the engine speed is lower than when the same shift is accomplished in the forward direction.

For example the transmission may be shifted from second speed to high speed when the speed of the vehicle is from 18-29 miles an hour, and the reverse shift from high to second may be accomplished when the speed of the vehicle has been lowered to ten miles per hour. This may be varied according to the preference of the engineer who designs the transmission, for the particular automobile in which the transmission is to be installed.

It is desirable to restrain an outward movement of the governor arms which would be too sudden, in order to prevent the governor arms from moving beyond the desired position, in order to select the desired speed.

For this purpose dashpots are provided for the respective cylinders 27 and 27a, the details of these dashpots being shown in Fig. 13. The cylinders 27 and 27a do not communicate with the main body of oil or other lubricant which fills the casing C.

Each of the cylinders 27 and 27a has a certain amount of oil inserted respectively therein, in order to provide for efficient lubrication of the pistons 28 and 28a. For this purpose the inner end of each cylinder 27 and 27a is closed and the body of oil is confined between the inner end of each cylinder 27 and 27a, and the respective hollow piston 28 and 28a.

Hence, if it is assumed that the pistons 27 and 27a are held in the vertical position while the engine is at rest, the body of lubricating oil which is in the upper cylinder 27 (this being the position illustrated in Fig. 13) is at the inner or lower end of said cylinder 27 and the body of oil in the lower cylinder 27a rests upon the inner surface of the piston 28a.

The cylinders 27 and 27a are respectively provided with dashpots 40 and 40a each of said dashpots consisting of a tube which is connected by means of suitable threading, to the inner end of the respective cylinder.

As shown in Fig. 13, each of said dashpots has a narrow longitudinal duct whose axis coincides with the axis of the cylinder and each of these narrow longitudinal ducts has a narrow lateral duct which communicates with the interior of the respective cylinder. In the position shown in Fig. 13, this lateral duct is a little below the median lateral plane of the cylinder 27. It will be understood that the dashpots 40 and 40a are identical in all respects.

When the piston 28 moves inwardly, or below the position illustrated in Fig. 13, air can escape through the narrow lateral duct or orifice, and through the longitudinal duct of the dashpot 40 into the atmosphere.

Hence, the dashpot device serves to restrain or brake the movement of the piston 28 in both directions.

The movement of the governor arms causes the actuation of the proper set of control levers 19, that is, the set of control levers which cooperates with a particular pair of clutch members.

As shown in Fig. 1, each control lever 19 is provided with a recess in which a pivot member 42 extends, the pivot member 42 being connected to the inner wall of the casing C. Each of the control levers 19 has its outer end passing through aligned slots which are provided in a corresponding sleeve 43.

As shown in Figs. 5 and 9, each of said cylinders or sleeves 43 is provided with a plunger 44. The cylinders or sleeves 43 constitute enlargements of a supplemental casing 45 which is bolted to the main casing C by means of bolts 46.

As shown in Fig. 13, each of the plungers 44 is provided with a plurality of balls 49 at the inner end thereof, these balls 49 being retained in position by bending over the adjacent end of each plunger 44. The end balls 49 can cooperate with cam recesses which are provided in a master control member 50. This single master control member 50 can be normally shifted to and fro in an axial direction in order to select first speed, second speed, and high speed. This master control member 50 can also be turned and then inwardly shifted in the same direction as that which is necessary to select first, second, and high speeds, in order to select reverse speed or the locked neutral position.

As shown in Fig. 5, the master control member 50 is provided with a plurality of first-speed recesses 51, three of such recesses being shown in this embodiment. These recesses are symmetrically disposed about the periphery of the master control member 50. Each of said recesses 51 cooperates with a corresponding control lever 19. Said master control member 50 is also provided with three second-speed recesses 52 which operate three plungers 44, which correspond to and operate three control levers 19.

Said master control member 50 is also provided with the same number of reverse-speed recesses 53, for controlling the inward movement of three plungers 44 which control three levers 19.

As shown in Fig. 5, each second-speed recess 52 is associated with a corresponding reverse-speed recess 53, so that three angular recesses are formed.

As shown in Fig. 13, the master control member 50 is mounted, by means of an anti-friction bearing 54, upon a longitudinally shiftable sleeve 55 which is slidably mounted by means of splines upon the transmission drive shaft 5. The member 55 turns in unison with the shaft 5, but the anti-friction bearing 54 makes it possible to prevent the turning of the master control member 50, so that this is not turned save when predetermined, in order to select reverse speed or the locked neutral position.

As shown in Fig. 13, the cylinders 28 and 28a are provided with recesses into which extend the ends of bell-crank levers 56 and 56a which are pivotally mounted at 57a. These pivot members 57a either form part or, or are connected to the casing 2a. For this purpose the casing 2a is provided with bracket arms 57.

As shown in Figs. 1 and 6, the bell-crank levers 56 and 56a have arms 59 and 59a whose heads are turnably located within lugs of a ring 60 which is connected to the sleeve 55 by means of cooperating screw threading. Hence, the movement of the cylinders 28 and 28a which is produced by the governor arms 23 and 23a causes a corresponding turning of the arms 59 and 59a and a corresponding longitudinal shifting of the sleeve 55 and of the master control member 50. When the master control member 50 is shifted to the first-speed position, the first-speed recesses 51 permit the inward movement of the plungers 44, which control the levers 19 of the clutch members 15b. The clutch members 15b are therefore forced into engagement with the flange 15a, so that the first-speed control sleeve is held against movement while the other sleeves 14 and 16 are permitted to freely turn.

The transmission then operates in first speed. It will be noted that the second-speed recesses 52 are located between the first-speed recesses 51 so that each set of recesses can only control its corresponding set of plungers and control levers.

Likewise, the reverse-speed recesses 53 cannot permit the inward movement of the control levers 19 which are associated with the clutch members 14b, due to the circumferential offset which is shown in Fig. 5. When the control member 50 has been shifted inwardly to the second-speed position, the second-speed recesses 52 permit the inward movement of the corresponding plungers 44, so that the springs 18 which are associated with the clutch members 14b throw the corresponding control levers 19 outwardly. In this position the second-speed control sleeve 14 is held from turning while the other sleeves can freely turn. As the master control member 50 is shifted from first-speed to second-speed, the control levers 19 which are associated with the clutch members 15b are inwardly forced into operative position, before the second-speed cam recesses 52 permit the movement of the control levers 19 which are associated with the clutch members 14b.

*High speed*

As shown in Figs. 5, 6 and 13, when the transmission is shifted from second to high, the sleeve 55 abuts and pushes the disk 61. This disk 61 is slidably mounted upon the transmission drive shaft 5, and a spline connection is provided between said disk 61 and said shaft 5 so that they turn in unison. When the shift member 55 abuts and begins to push the member 61, the member 90, which is shown in Fig. 21, and which will be later more fully described, moves to the dotted line position shown in said Fig. 21.

As shown in Fig. 13, the disk 61 is provided with a contact ring 62, which can push the disk 63. The disk 63 is provided with a series of rods 21, which pass through a series of openings 21a (see Fig. 20), which are provided in a plate 20 which is connected to the second-speed sleeve 14. The inner ends of these rods or pins 21 are connected to the locking member 22.

As shown in Fig. 13, the outer end of the first-speed sleeve 15 cooperates with a slidable disk 65, having a friction disk 64. The disk 65 is slidably mounted upon the adjacent end of the second-speed sleeve 14, and a spline connection is provided so that the disk 65 and the second-speed sleeve 14 turn in unison.

As shown in Fig. 6a, the disk 65 is provided with a plurality of pins 66 which are suitably connected thereto, and these pins 66 are provided with slidable housings 67 which are fastened to the interlocking member 22. Compression springs 68 are located within the housings 67 and the ends of each said compression spring 68 respectively abut the disk 65 and the opposite end of a housing 67.

Hence, the compression springs 68 tend to force the member 22 away from the operative or interlocking position which is shown in Fig. 6a, to the inoperative position shown in Fig. 1.

As the member 22 is forced to its interlocking position, the springs 68 are first compressed so that the friction ring 64 is previously forced into the operative position shown in Fig. 6a, so that the speed of revolution of the first-speed sleeve and of the second-speed sleeve is substantially equalized, before the interlocking member 22 is pushed into operative position. As the interlocking member 22 is moved to the operative position shown in Fig. 6a, the friction disc 64 contacts with the corresponding surface of sleeve 15, before said member 22 engages sleeve 15. The further movement of interlocking member 22 slides housings 67 on pins 66 so that springs 68 are compressed, and these springs force friction ring 64 against sleeve 15. The interlocking member does not engage sleeve 15 until sleeves 15 and 14 have had their speeds equalized to at least some extent.

As shown in Figs. 6a and 13, the disk 63 has a central perforated portion so that it does not exert any pressure upon the pins 66.

Referring to Figs. 13, 21 and 22, when the member 61 is shifted to the high speed position which is indicated in dotted lines in Fig. 13, the fork 90a causes the sleeve 90 to be also slid upon the pin 91. The sleeve 90 has the pin 93 which engages the fork 94, said fork 94 being freely mounted upon the pin 95 so that the fork can turn with respect to the pin 95. The fork 94 has the position shown in Fig. 22, when the transmission is in first speed and second speed (and also when the transmission is in neutral and reverse). Hence, the sliding movement of the sleeve 90 moves the fork 94 from the position shown in Fig. 22 to the dotted line position which is shown in Fig. 21. There is sufficient lost motion between the forked lever 94 and the push-lever 96, which is keyed or otherwise suitably connected to the turnable pin 95, in order to permit said member 94 to move from the full line position shown in Fig. 22, to the dotted line position shown in Fig. 21.

*Reverse speed*

In order to set the transmission for reverse speed, the master control member 50 must be turned around its own axis.

For this purpose a shaft 70 which is shown in Fig. 11, is provided with a suitable manual control which can be operated either upon the steering column, or at the dashboard of the vehicle, so that the shaft 70 can be turned. The shaft 70 is provided with a cam 71 which is keyed thereto so that the cam 71 and the shaft 70 turn in unison. The cam 71 is provided with a cam groove which turns the follower arm 72 in the clockwise direction, as shown in dotted lines in Fig. 11. The arm 72 is pivotally mounted at 73 to the inner wall of the casing C. The dotted line position which is shown in Fig. 11 illustrates the locked neutral and also the reverse speed position of the arm 72. The lever 72 is provided with a flange 74 and the fork 75 is slidably mounted on the flange 74. This fork 75 is integral with a ring 76 which is connected to turn in unison with the master control member 50 by means of suitable lock threading, as shown in Fig. 12. Hence, the master control member 50 can be turned around its own axis by turning the lever 72, and the cam member 50 is also free to slide with respect to the flange 74 of the lever 72. It is understood that the cam member 50 is only turned when it is desired to move it to the reverse-speed position or to the locked neutral position. Otherwise the action of the governor arms slides the master control member 50 to and fro, without any turning movement thereof.

When the master control member 50 has been suitably turned, a movement thereof towards the inner end of the apparatus causes the reverse speed recesses 53 to become aligned with the corresponding plungers 44, so that the movement of the master control member 50 does not permit the release of any control levers 19, save those control levers 19 which are associated with the clutch member 16b.

It is desirable to prevent the transmission from being set into reverse, until it has been previously set to neutral.

For this purpose, and as shown in Figs. 11 and 13, the ring 76 is provided with an arm 77 which can slide along the control bar 78 which is fixed to the casing C. However, the bar 78 prevents the turning of the ring 76 save that when the transmission is in free neutral. Then the arm 77 clears the bar 78, so that said member 77 can be turned counterclockwise from the full line position shown in Fig. 11.

Locked neutral position

In order to secure the locked neutral position, the shaft 70 is turned until the lever 72 is in the dotted line position shown in Fig. 11. This can only be done if the transmission has been previously set into the free neutral position due to the action of the members 77 and 78 which has been previously explained. In the locked neutral position, the master control member 50 has been moved in a direction towards the flywheel 2, as far as said master control member 50 can be moved.

As shown in Figs. 21 and 22, the cam groove in the cam 71 may be considered as having three branches, namely, an end branch 71a, an intermediate branch 71b and a second end branch 71c. The end branches 71a and 71c are perpendicular to the central longitudinal axis of the cam 71, so that these portions of the cam groove do not produce any longitudinal shifting of a follower. The intermediate branch 71b is suitably inclined so that this operates to shift a follower from one of the end branches to the other, the direction of shift being dependent upon the direction of turning of the cam 71.

As shown in Figs. 11, 21 and 22, the cam groove of the cam 71 cooperates with two followers 80 and 72a, which can consist of ordinary rollers which are respectively located at the end of the link 99 and at the end of the lever 72.

As shown in Figs. 21 and 22 when the transmission is in free neutral, reverse, first-speed, second-speed, and also high speed, the follower 80 of the link 99 is at the closed or inner end of the branch 71a of the cam groove. Likewise, when the transmission is in first-speed, second-speed, neutral, and also high speed, the follower 72a of the lever 72 is at the outer end of the branch 71a. Hence, if the cam 71 is turned by suitably turning the shaft 70, the follower 72a is immediately acted upon by the intermediate inclined branch 71b, but said shaft 70 can be turned for about one-third of a revolution before the follower 80 is acted upon by this inclined intermediate branch 71b. The shaft 70 is turned by means of a suitable arm which can be connected to the steering column or to the dashboard or to any other convenient location, and for convenience three positions of the shaft 70 may be indicated, the outer positions being respectively "lock neutral" and "forward" and the intermediate position being "reverse." That is, when the engine is started, the cam 71 is in such position that the transmission is in lock neutral and the cam 71 is then shifted to a position corresponding to the reverse position, before said cam 71 is shifted to a position corresponding to the forward speeds. However, the reverse speed cannot be selected unless fuel is fed to the engine in order to increase its speed above the idling speed, so that the cam 71 can be shifted from the lock neutral position, through the reverse position, and into the forward speed position, without causing any of the gear trains to be actuated because said gear trains are only selected when the driver presses upon the accelerator in order to increase the speed of the engine above the idling speed. However, if desired, the cam 71 can be shifted from the initial lock neutral position to the reverse speed position, and fuel can then be fed to the engine in order to increase its speed upon to the point where the governor arms operate to separate, and to thus select the reverse speed.

In order to pass from lock neutral position, it may be assumed that the shaft 70 is turned clockwise if it is assumed that the observer is at the right-hand side of Fig. 21. The follower 80 of the link 99 is acted upon immediately by the inclined branch 71b, so that when the shaft 70 has been turned about a third of a revolution, the follower 80 has been shifted from the outer end of the branch 71c to the outer or open end of the branch 71a. The link 99 has been shifted from the full line position shown in Fig. 21 to the dotted line position shown in Fig. 21 and the lever 97 has turned the pin 95 until the push-lever 96 is in the full line position shown in Fig. 22. The sleeve 90 has now been moved from the position shown in Fig. 13 and Fig. 21 (full lines) to the position shown in Figs. 1, 5 and 22.

At the beginning of the turning movement of the cam 71 above mentioned, the follower 72a was at the inner or closed end of the branch 71c so that the follower 72a is now at the outer end of the branch 71c. That is, the follower 72a has now been shifted to that position of the follower 80 which is illustrated in full lines in Fig. 21. That is, at the end of the first third of a revolution, the follower 72a has not been longitudinally shifted, but it is now in a position where further turning of the cam 71 will cause the same to be longitudinally shifted. The first third of a revolution of the cam 71 has longitudinally shifted the follower 80, but the follower 80 is now in a position where it will not be longitudinally shifted by further turning of the cam 71. Hence the lever 72 is in the dotted line position shown in Fig. 11, but the shifting of sleeve 90 and of its fork 90a has shifted disc 61, so that locking pin 83 is now in the inoperative position. The transmission is now in reverse.

Upon turning the shaft 70 an additional third of a revolution, the follower 80 is not longitudinally shifted, because it merely moves to the inner end of the branch 71a. During this second third of a revolution, the follower 72a is shifted from the dotted line position shown in Fig. 11 to the full line position shown in Fig. 11, so that the transmission is now in "forward". It will be noted that when the follower 80 is longitudinally shifted in order to actuate the link 99, the push-lever 96 operates to shift the sleeve 90 from the full line position shown in Fig. 21, to the full line position which is shown in Fig. 22.

As shown in Figs. 16 and 17, the governor arm 23 is provided with a perforated forked member 81, and the arm 23a is provided with a perforated extension 82. When the members 81 and 82 have their perforations engaged by a locking pin 83, the governor arms 23 and 23a cannot separate.

As shown in Fig. 13, the locking pin 83 is slidably mounted in a recess in the shaft 5, and the inner end of the locking pin 83 is connected by means of the pin 87, to the disk 61. The shaft 5 is provided with a longitudinal slot 89 of suitable length, in order to permit a sufficient longitudinal movement of the disk 61 and of the parts connected thereto.

As shown in Figs. 11 and 13, the disk 61 interfits with a fork 90a which is integral with a sleeve 90. This sleeve 90 is slidably mounted upon a rod 91, this rod 91 being connected at one end by means of the arm 92 to the casing C. The other end of the rod 91 is connected to the supplemental housing 45, by means of a suitable nut, as shown in Fig. 13. The sleeve 90 does not turn although the fork 90a causes it to be slid back and forth in unison. As previously stated, the disk 61 turns in unison with the shaft 5, due to a spline connection.

As shown in Fig. 21, the sleeve 90 is provided with a pin 93 and a fork 94 fits over said pin 93. This fork 94 is turnably mounted upon a pin 95, which is connected to the casing C. The pivoted fork 94 is actuated in one direction or in the opposite direction, by means of a push-lever 96. The push-lever 96 is integral with the turnable pin 95 so that the push lever 96 and the pin 95 turn in unison, it being noted that the fork 94 is loosely mounted upon the pin 95, so that the fork 94 and the pin 95 do not turn in unison. When the disc 61 is moved from the position shown in Fig. 5 to the position shown in Fig. 6, the fork 90a causes the sleeve 90 to be moved to the high speed position thus designated.

In order to guide the movement of the link 99, the follower 80 slides longitudinally in a guide groove of a guide member 100, which is rigidly connected to the casing C.

As shown in Figs. 21 and 22, the sleeve 90 is provided with a recess 101, which can be releasably engaged by means of the spring-pressed plunger 102, which is mounted in the sleeve 103. A compression spring 104 forces the plunger 102 outwardly.

When the transmission is in first speed, second speed, reverse speed, and in free neutral position, the head of the plunger 102 engages the recess 101, as shown in Fig. 22.

In the locked neutral position which is shown in full lines in Fig. 21, the sleeve 90 has been shifted so that the plunger 102 no longer enters the recess 101.

The high speed position of the sleeve 90 is shown in dotted lines in Fig. 21, and in full lines in Fig. 10.

The plunger 102 constitutes a releasable locking device for holding the sleeve 90 in position, when the transmission is in first speed, second speed, reverse speed and free neutral position.

While the improved transmission illustrated is of the automatic type, the invention is not to be limited to an automatic transmission, as many of the parts illustrated and their sub-combinations, could be utilized in a manually-controlled transmission.

Likewise, while the invention has been illustrated with reference to a transmission of the planetary type, it is not necessarily limited to any particular type of transmission.

Likewise, while I have shown a complete mechanism, it is obvious that the invention embraces numerous valuable sub-combinations, which can be used independently of the complete mechanism illustrated.

It will be noted that the sleeve 55 does not operate to push the member 61, in a direction towards the driven shaft 3 (or towards the inner end of the apparatus) until said sleeve 55 has been moved beyond the second speed position.

When the device is not in "high", the member 61 is prevented from shifting longitudinally, due to vibration, or the like, by means of the plunger 102 which engages the recess 101 of the collar 90.

As shown in dotted lines in Fig. 21, when the master control member 50 is pushed inwardly to the high speed position, the fork 90a operates to release the sleeve 90 from the plunger 102. When the master control member 50 is pushed back or outwardly, as for example when the transmission is shifted from high speed to second speed, the springs 68 operate to push the member 63 into the position shown in Fig. 1 and the backward or outer movement of the member 61 is sufficient to cause the plunger 102 to at least partially enter the recess 101. Due to the curved shape of the recess 101, and the corresponding curved or cam shape of the outer end of the plunger 102, the plunger 102 acts to releasably lock the collar 90, in the position shown in Fig. 22.

While I have shown a particular type of planetary transmission having a plurality of planetary shafts 6a, 7a and 8a, this form of planetary transmission may be varied at will without departing from the invention since there are numerous well known types of planetary transmission, and the invention consists in the speed-responsive control of said planetary transmission. The sleeves 14, 15 and 16 constitute selector members, each of which selects a speed which is below high speed, when it is held immovable and the holding of said selector members is controlled by the speed-responsive movement of the governor device.

As shown in Fig. 22, when the transmission is in second speed, the fork 94 is spaced from one end of the arm 96. Hence, when the sleeve 90 is shifted to the dotted line position shown in Fig. 21, so that the device is then in high speed, the fork 94 can be turned without actuating the arm 96, or the members 97 and 99.

Fig. 22 also shows the position of the sleeve 90 in the free neutral position, and a comparison between Fig. 21 and Fig. 22 shows that the fork 96 only operates to push the sleeve 90 into and away from the position which it occupies when the transmission is in locked neutral.

It will be noted that the drive shaft and the driven shaft can be connected by means of a plurality of trains of gears which are adapted to actuate the driven shaft at different speeds relative to the drive shaft. The sleeves 14, 15 and 16 are selector devices which operate to select one of said trains of gears, in order to cause the same to become operative. These selector devices are controlled by the speed-responsive movement of the speed responsive governor. Likewise, said trains of gears are interlocked by means of the member 22, in order to cause the drive shaft and the driven shaft to turn at the same velocity. The friction means, such as the member 64, operate before this interlocking action is produced, in order to cause the drive shaft and the driven shaft to turn at substantially the same velocity, before the interlocking action of the member 22 is either started or completed. That is, when the members 14 and 15 are turning at the same velocity, the shafts 3 and 5 are also turning in unison at the same velocity.

When the sleeve 90 is in the full line position shown in Fig. 21, the disk 61 which is shown in Fig. 13, has been moved into the position illustrated in full lines in said Fig. 13, so that the locking pin 83 is in operative position.

When the cam 71 is turned through its first third of a revolution, from the position shown in Fig. 21, the follower 80 is moved from the full line position shown in Fig. 21 to the dotted line position shown in Fig. 21.

This shifts the sleeve 90 from the full line position shown in Fig. 21 to the position shown in Fig. 22. This shifting of the sleeve 90 operates to shift the disk 61, by means of the fork 90a so as to move the locking pin 83 to the inoperative position. The lever 72 is now in the dotted line position shown in Fig. 11, because the cam groove of the cam 71 has not operated to longitudinally shift the follower 72a. Upon turning the cam 71 another third of a revolution, the follower 80 is not shifted, but the follower 72a is shifted to the full line position shown in Fig. 11, so that the member 50 is turned in order to cause the same to select forward speeds.

Although I have shown a plurality of planetary gear shafts 6a, 7a and 8a, I do not wish to be limited to the use of a plurality of such shafts, because a single planetary shafts having a series of gears at each end thereof would be operative and the purpose of using a plurality of such shafts, as illustrated in Fig. 8, is to provide a better dynamic balance.

It will be noted that the drive shaft and the driven shaft are in alignment, and that they are interlocked when the transmission is in high, so that a direct drive is then secured without the noise and waste of power which is the result of using a train of gears. While I have shown the drive shaft and the driven shaft positively interlocked when the transmission is in high, I do not wish to exclude a frictional connection from the scope of the invention, when the transmission is in high, as long as a direct drive is secured without the use of two or more gears. When I specify, in the claims, that the shafts are interconnected in "high" speed, I refer to a direct connection, without the use of intermediate gears.

I claim:

1. In an automatic speed transmission having a driving shaft and a driven shaft, a plurality of movable selector members, each of said selector members being adapted to select a speed of said driven shaft below high speed when said selector member is held immovable, a speed-responsive governor device, and holding means for said selector members, said holding means being caused to be moved and being free to be moved into successive operative position solely by the movement of said governor device, and means operated by said governor device to interconnect said shafts so that they turn at the same velocity.

2. In an automatic planetary speed transmission, a plurality of revoluble planetary shafts having two series of planetary gears, a driven shaft having a sun gear which meshes with one of said series of planetary gears, revoluble control sleeves respectively intermeshing with the other series of said planetary gears, each of said control sleeves being associated with a clutch adapted to prevent the same from turning, a single speed-responsive governor device, and control means for said clutches operable by the speed-responsive movement of said governor device.

3. In a planetary speed transmission, a driven shaft having a sun gear, a drive shaft having plentary gear shafts connected thereto so that said planetary gear shafts rotate about the axis of said drive shaft and of said driven shaft, two series of planetary gears mounted on said planetary gear shafts, one of said series of planetary gears meshing with said sun gear, revoluble control sleeves respectively meshing with the other series of said planetary gears, said control sleeves being provided with clutch members, movable clutch means associated with each of said clutch members and adapted to prevent the turning of said control sleeves, springs adapted to urge said movable clutch means into operative position, control members adapted to hold said movable clutch means in inoperative position, and control means for said control members, said control means being adapted to be actuated by the speed-responsive movement of a speed-responsive governor device.

4. In a planetary speed transmission, a driven shaft having a sun gear, a drive shaft having plentary gear shafts connected thereto so that said planetary gear shafts rotate about the axis of said drive shaft and of said driven shaft, two series of planetary gears mounted on said planetary gear shafts, one of said series of planetary gears meshing with said sun gear, revoluble control sleeves respectively meshing with the other series of said planetary gears, said control sleeves being provided with clutch flanges, a pair of movable clutch devices associated with each of said clutch flanges, each pair of said movable clutch devices having springs adapted to actuate them into operative position, control levers having heads which are adapted to maintain the respective pairs of movable clutch devices in separated position, plungers cooperating with the free ends of said control levers, and a cam member having recesses adapted to control the positions of said plungers, said cam member being shiftable in a direction parallel to the axis of said driving shaft.

5. A speed transmission comprising a drive shaft, a driven shaft, connecting means between said drive shaft and said driven shaft and including a plurality of trains of gears which are adapted to actuate said driven shaft at different speeds relative to said drive shaft, interlocking means adapted to interlock a plurality of said trains of gears in order to cause said drive shaft and said driven shaft to turn at the same velocity, and friction means adapted to be operated in unison with said interlocking means and to cause said shafts to have substantially the same velocity, before said interlocking means are operative.

6. A speed transmission of the planetary type comprising a drive shaft, a driven shaft, a plurality of trains of planetary gears adapted to connect said drive shaft and said driven shaft so that said driven shaft is turned at different speeds relative to said drive shaft, separate and separately revoluble control sleeves adapted to respectively mesh with said trains of gears, an interlocking member adapted to interlock a pair of said control sleeves in order to cause the drive shaft and the driven shaft to turn at the same speed, and a friction device operated by the movement of said interlocking member and adapted to frictionally connect the control sleeves to be interlocked before said control sleeves are positively interlocked by means of said interlocking member.

7. A speed transmission of the planetary type comprising a drive shaft, a driven shaft, a plurality of trains of planetary gears adapted to connect said drive shaft and said driven shaft so that said driven shaft is turned at different speeds relative to said drive shaft, separate and separately revoluble control sleeves adapted to respectively mesh with said trains of gears, a pair of said control sleeves comprising a sub-unit which is adapted to cause said drive shaft and said driven shaft to be turned at the same speed when said pair of sleeves are interlocked, one of said pair of sleeves having an interlocking member slidably mounted thereon and turning in unison therewith and said control sleeve also having a friction device slidably mounted thereon and turning in unison therewith, said friction device being adapted to frictionally engage the other of said pair of sleeves in order to cause both sleeves of said sub-unit to turn in unison, and means adapted to first move said friction device into operative position and to then move said interlocking device into operative position.

8. A speed transmission of the planetary type comprising a drive shaft, a driven shaft, a plurality of trains of planetary gears adapted to connect said drive shaft and said driven shaft so that said driven shaft is turned at different speeds relative to said drive shaft, separate and separately revoluble control sleeves adapted to respectively mesh with said trains of gears, a pair of said control sleeves comprising a sub-unit which is adapted to cause said drive shaft and said driven shaft to be turned at the same speed when said pair of sleeves are interlocked, one of said pair of sleeves having an interlocking member slidably mounted thereon and turning in unison therewith and said control sleeve also having a friction device slidably mounted thereon and turning in unison therewith, said friction device being adapted to frictionally engage the other of said pair of sleeves in order to cause both sleeves of said sub-unit to turn in unison, and means adapted to first move said friction device into operative position and to then move said interlocking device into operative position, said friction device having spring means connected thereto, and said interlocking device having means connected thereto which are adapted to stress said spring means in order to force said friction device into operative position.

9. A speed transmission of the planetary type comprising a drive shaft, a driven shaft, a plurality of trains of planetary gears adapted to connect said drive shaft and said driven shaft so that said driven shaft is turned at different speeds relative to said drive shaft, separate and separately revoluble control sleeves adapted to respectively mesh with said trains of gears, clutches adapted to respectively engage said control sleeves so as to stop the turning movement thereof so that the control sleeve whose turning is stopped operates to select one of said trains of planetary gears, a movable control member adapted to control the operation of said clutches, and an interlocking member adapted to interlock a pair of said control sleeves, said interlocking member being moved into the operative position by said movable control member at a predetermined point in the movement thereof.

10. A speed transmission comprising a drive shaft, a driven shaft, connecting means between said shafts, said connecting means including a plurality of trains of gears which are adapted to actuate said drive shaft at different speeds relative to said driven shaft, selector devices adapted to select one of said trains of gears in order to cause said selected train of gears to become operative, and a speed-responsive governor device adapted to control said selector devices by the speed-responsive movement thereof, said governor device having a plurality of cam teeth, and a spring operated plunger adapted to releasably engage said cam teeth.

11. A speed transmission comprising a drive shaft, a driven shaft, connecting means between said shafts, said connecting means including a plurality of trains of gears which are adapted to actuate said drive shaft at different speeds relative to said driven shaft, selector devices adapted to select one of said trains of gears in order to cause said selected train of gears to become operative, and a speed-responsive governor device adapted to control said selector devices by the speed-responsive movement thereof, said governor device having a plurality of cam teeth, and a spring operated plunger adapted to releasably engage said cam teeth, said cam teeth having opposite faces of different tapers.

12. An automatic speed transmission comprising a drive shaft, a single speed-responsive governor device connected to said drive shaft so as to turn in unison therewith, spring means connected to said governor device and adapted to hold the same in predetermined position so that the centrifugal force produced by the turning of said governor device tends to move it away from said predetermined position, connecting means between said drive shaft and a driven shaft, said connecting means including a plurality of trains of gears which are adapted to actuate said drive shaft at different speeds relative to said driven shaft, selector devices adapted to select one of said trains of gears in order to cause said selected train of gears to become operative and automatic means adapted to hold said governor device in a plurality of different positions with respect to said predetermined position.

13. An automatic speed transmission comprising a drive shaft, a driven shaft, connecting means between said shafts, said connecting means including a plurality of trains of gears which are adapted to actuate said drive shaft at different speeds relative to said driven shaft, selector devices adapted to select one of said trains of gears in order to cause said selected train of gears to become operative, and a single speed-responsive governor device adapted to control said selector devices by the speed-responsive movement thereof, said governor device comprising a pair of pivoted arms which are maintained in a given plane and which are turned in said plane by the movement of the drive shaft, and means adapted to lock said governor arms from movement in said plane, when the transmission is in neutral.

14. An automatic speed transmission comprising a drive shaft, a driven shaft, connecting means between said shafts, said connecting means including a plurality of trains of gears which are adapted to actuate said drive shaft at different speeds relative to said driven shaft, selector devices adapted to select one of said trains of gears in order to cause said selected train of gears to become operative, and a single master control member for said selector devices, said master control member having cam means adapted to cause the successive selection of a plurality of trains of gears when said control member is longitudinally shifted, and means operated by said master control member to interconnect said shafts so that they turn at the same velocity.

15. A speed transmission comprising a drive shaft, a driven shaft, connecting means between said shaft, said connecting means including a plurality of trains of gears which are adapted to actuate said drive shaft at different speeds relative to said driven shaft, selector devices adapted to select one of said trains of gears in order to cause said selected train of gears to become operative, and a master control member for said selector devices, said master control member having cam means adapted to cause the successive selection of a plurality of trains of gears when said control member is longitudinally shifted, said control member having additional cam means which are operative to cause the selection of another train of gears when said control member is first turned and is then shifted.

16. A planetary speed transmission comprising a drive shaft, a driven shaft, connecting means between said shafts, said connecting means including a plurality of trains of planetary gears which are adapted to actuate said drive shaft at different speeds relative to said driven shaft, each said train of planetary gears being in mesh with a revoluble control sleeve, clutches adapted to respectively engage said sleeves in order to prevent the turning thereof in order to select one of said trains of gears, clutch opening members associated with said clutches and adapted to hold them in open position, and a longitudinally shiftable cam member having cam means adapted to control the positions of said clutch opening members.

17. A planetary speed transmission comprising a drive shaft, a driven shaft, connecting means between said shafts, said connecting means including a plurality of trains of planetary gears which are adapted to actuate said drive shaft at different speeds relative to said driven shaft, each said train of planetary gears being in mesh with a revoluble control sleeve, clutches adapted to respectively engage said sleeves in order to prevent the turning thereof in order to select one of said trains of gears, clutch opening members associated with said clutches and adapted to hold them in open position, and a longitudinally shiftable cam member having cam means adapted to control the positions of said clutch opening members, said cam member being turnable and having additional cam means which become operative when said cam member is turned and then shifted, in order to control the clutch opening members associated with one of said clutches.

18. A planetary speed transmission comprising a drive shaft, a driven shaft, connecting means between said shafts, said connecting means including a plurality of trains of planetary gears which are adapted to actuate said drive shaft at different speeds relative to said driven shaft, each said train of planetary gears being in mesh with a revoluble control sleeve, clutches adapted to respectively engage said sleeves in order to prevent the turning thereof in order to select one of said trains of gears, clutch opening members associated with said clutches and adapted to hold them in open position, a shift sleeve mounted upon said drive shaft and adapted to turn in unison therewith, a cam member mounted on said shift sleeve so as to be longitudinally shiftable in unison therewith, said shift sleeve being turnable with respect to said cam member, said cam member having cam means arranged laterally on the surface thereof and adapted to control the positions of said clutch opening members, means adapted to longitudinally shift said shift sleeve, and means adapted to turn said cam member on said shift sleeve to a predetermined position.

19. A speed transmission comprising a drive shaft, a driven shaft, connecting means between said shaft, said connecting means including a plurality of trains of gears which are adapted to actuate said driven shaft at different speeds relative to said drive shaft, selector means adapted to select one of said trains of gears in order to cause said selected train of gears to become operative, said selector devices including a master control member which can be shifted forwards and backwards, said master control member having a predetermined position corresponding to free neutral in which position none of said trains of gears are selected, a speed-responsive governor device connected to said master control member and adapted to shift said master control member forwardly from said free neutral position, said master control member having cam means spaced thereon in the direction of its movement and adapted to select a plurality of forward speeds upon the forward shifting thereof, manual control means adapted to turn said master control member around its axis and to hold the same in turned position, and additional cam means on said master control member and adapted to select reverse speed when said master control member is forwardly shifted.

20. In a speed transmission, a plurality of movable selector members, each of said selector members being adapted to select a speed below high speed when said selector member is held immovable, a speed-responsive governor device, holding means for said selector members, actuating means for said holding means, said actuating means being independent of said governor device, and control means for said actuating means operable by said governor device.

21. In a speed transmission, a plurality of movable selector members, each of said selector members being adapted to select a speed below high speed when said selector member is held immovable, spring-operated holding means adapted to selectively hold said selector members immovable, control means for said spring-operated holding means, and a single speed-responsive governor device adapted to control said control means.

22. In a speed transmission, a plurality of concentric selector sleeves freely revoluble with respect to each other, each of said selector sleeves being adapted to select a speed below high speed when it is held immovable, each said selector sleeve having a clutch flange, a pair of clutch members associated with each clutch flange and adapted to prevent the turning thereof, springs adapted to force said clutch members to operative position, control members having heads adapted to enter between the respective pairs of clutch members to hold them separated, said clutch members and said heads being shaped so that said clutch members can force said control members into inoperative position, a control device for said control members, and a speed-responsive governor device adapted to operate said control device.

23. In a speed-transmission, a drive shaft, a driven shaft, a plurality of trains of gears intermediate said shafts and adapted to turn said driven shaft at a plurality of speeds relative to said drive shaft, a plurality of concentric selector sleeves revolubly mounted upon said drive shaft and upon each other, said selector sleeves having clutch flanges spaced from each other in a direction parallel to the axis of the drive shaft, a pair of non-revoluble clutch members associated with each clutch flange, springs connected with said clutch members and adapted to force them into operative position, control heads having levers adapted to respectively hold the pairs of clutch members spaced from each other, said heads being shaped so that when said clutch members are actuated by said springs, said clutch members automatically move said heads into inoperative position, a speed-responsive governor device, and means operated by said speed-responsive governor device and adapted to control the positions of said heads.

24. In an automatic transmission device, a drive shaft, a driven shaft, a plurality of trains of gears intermediate said shafts and adapted to turn said driven shaft at a plurality of speeds relative to said drive shaft, selector means adapted to select one of said trains of gears in order to render the same operative, said selector means including friction means, a cam device adapted to control said friction means and a speed-responsive governor connected to said cam device and adapted to actuate the same, said cam device being slidable by said governor in a direction parallel to the common axis of said drive shaft and of said driven shaft, said cam device being also revoluble about said axis, and control means adapted to prevent the turning of said cam device save when the transmission is in neutral.

25. In an automatic transmission device, a drive shaft, a driven shaft, a plurality of trains of gears intermediate said shafts and adapted to turn said driven shaft at a plurality of speeds relative to said drive shaft, a cam device adapted to select one of said trains of gears in order to render the same operative, said cam control device being slidable in a direction parallel to the common axis of said drive shaft and of said driven shaft, a speed-responsive governor adapted to actuate said cam device in said direction, said cam device being also revoluble about said common axis, a manually-controlled cam device, a locking member for said governor device, said locking member being connected to and being operated by said cam device, said cam control device being also connected to and being turnable by said manually-controlled cam device.

26. In an automatic transmission device, a drive shaft, a driven shaft, a plurality of trains of gears intermediate said shafts and adapted to turn said driven shaft at a plurality of speeds relative to said drive shaft, a cam device adapted to select one of said trains of gears in order to render the same operative, said cam control device being slidable in a direction parallel to the common axis of said drive shaft and of said driven shaft, a speed-responsive governor adapted to actuate said cam device in said direction, said cam device being also revoluble about said common axis, a manually-controlled cam device, a locking member for said governor device, said locking member being connected to and being operated by said cam device, said cam control device being also connected to and being turnable by said manually-controlled cam device, said manually-controlled cam device being adapted to first move the locking device into inoperative position and to then turn said cam control member.

WILLIAM HASSELKUS.